(12) United States Patent
Tang et al.

(10) Patent No.: US 9,076,121 B2
(45) Date of Patent: Jul. 7, 2015

(54) DIMENSIONAL TRANSLATOR

(71) Applicant: Catalina Marketing Corporation, St. Petersburg, FL (US)

(72) Inventors: Paul Tang, Tampa, FL (US); Jeffrey R. Mount, Palm Harbor, FL (US); Kelly Carrigan, Seminole, FL (US); Brad Schulz, Odessa, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 14/223,585

(22) Filed: Mar. 24, 2014

(65) Prior Publication Data

US 2014/0324641 A1 Oct. 30, 2014

Related U.S. Application Data

(63) Continuation of application No. 13/627,372, filed on Sep. 26, 2012, now Pat. No. 8,678,272.

(51) Int. Cl.
*G06F 17/00* (2006.01)
*G06Q 10/08* (2012.01)

(52) U.S. Cl.
CPC .......... *G06Q 10/087* (2013.01); *G06Q 10/0875* (2013.01)

(58) Field of Classification Search
CPC .......... G06F 17/00; G06F 7/08; G06F 19/00; G06Q 30/00; G06Q 90/00; G06K 19/00
USPC ............... 235/375, 487, 385, 381; 705/26, 1, 705/14.14, 14.22, 14.26, 14.36
See application file for complete search history.

(56) References Cited

U.S. PATENT DOCUMENTS

| | | | |
|---|---|---|---|
| 6,418,441 B1 | 7/2002 | Call | 707/10 |
| 6,430,554 B1 | 8/2002 | Rothschild | 707/3 |
| 7,133,882 B1 | 11/2006 | Pringle et al. | 707/104.1 |
| 7,392,237 B2 | 6/2008 | Pratt | 707/3 |
| 7,590,754 B2 | 9/2009 | Woolston | 709/238 |
| 7,600,682 B2 | 10/2009 | Bezos et al. | 235/383 |
| 7,734,506 B2 | 6/2010 | Ouchi | 705/26 |
| 7,814,470 B2 * | 10/2010 | Mamou et al. | 717/162 |
| 7,949,691 B1 | 5/2011 | Franciscus de Heer et al. | 707/822 |
| 8,086,643 B1 | 12/2011 | Tenorio | 707/802 |
| 8,678,272 B1 | 3/2014 | Tang et al. | 235/375 |

(Continued)

FOREIGN PATENT DOCUMENTS

| | | |
|---|---|---|
| WO | WO 01/27720 | 4/2001 |
| WO | WO 2014/052570 | 4/2014 |

*Primary Examiner* — Edwyn Labaze
(74) *Attorney, Agent, or Firm* — Pillsbury Winthrop Shaw Pittman LLP

(57) ABSTRACT

A dimensional translator may automatically translate a dimension from an entity to a different dimension of another entity. The dimensional translator may do so by comparing attributes of the input dimension (the dimension to be translated) to attributes of a target data structure. An attribute may include, for example, hierarchy of a data structure, relationships of a data structure, a keyword associated with a data structure, and a data value associated with the data structure. The dimensional translator may automatically determine how a target entity would categorize the item. In particular, a Universal Product Code dimension of an item provided by an entity may be translated into a data structure of a target entity such as a retailer in order to determine how an item identified by the UPC will be categorized by the retailer.

32 Claims, 7 Drawing Sheets

(56) References Cited

U.S. PATENT DOCUMENTS

| | | | |
|---|---|---|---|
| 2002/0133479 A1 | 9/2002 | Dippold | 707/1 |
| 2002/0169687 A1 | 11/2002 | Perkowski | 705/26 |
| 2002/0198791 A1 | 12/2002 | Perkowski | 705/26 |
| 2003/0009392 A1 | 1/2003 | Perkowski | 705/26 |
| 2004/0225664 A1 | 11/2004 | Casement | 707/100 |
| 2005/0049914 A1* | 3/2005 | Parish | 705/14 |
| 2005/0109844 A1 | 5/2005 | Hilliard | 235/383 |
| 2005/0171806 A1 | 8/2005 | J'maev | 705/1 |
| 2005/0251409 A1 | 11/2005 | Johnson et al. | 705/1 |
| 2006/0041469 A1 | 2/2006 | Mathis | 705/14 |
| 2008/0065490 A1 | 3/2008 | Novick et al. | 705/14 |
| 2008/0288538 A1 | 11/2008 | Hunt et al. | 707/104.1 |
| 2009/0006156 A1 | 1/2009 | Hunt et al. | 705/7 |
| 2009/0006276 A1 | 1/2009 | Woolston et al. | 705/400 |
| 2009/0006788 A1 | 1/2009 | Hunt et al. | 711/156 |
| 2009/0018996 A1 | 1/2009 | Hunt et al. | 707/2 |
| 2010/0049731 A1* | 2/2010 | Kiran Vedula | 707/102 |
| 2010/0121697 A1 | 5/2010 | Lin et al. | 705/14.14 |
| 2010/0228604 A1* | 9/2010 | Desai et al. | 705/10 |
| 2011/0082731 A1 | 4/2011 | Kepecs | 705/14.17 |
| 2011/0184816 A1* | 7/2011 | Jones et al. | 705/14.71 |
| 2012/0303411 A1 | 11/2012 | Chen et al. | 705/7.31 |
| 2014/0143099 A1* | 5/2014 | Wilkins | 705/28 |

* cited by examiner

DIMENSIONAL TRANSLATOR

CROSS-REFERENCE TO RELATED APPLICATION

This application is a continuation of U.S. patent application Ser. No. 13/627,372 filed Sep. 26, 2012 (issuing on Mar. 25, 2014 as U.S. Pat. No. 8,678,272), which is hereby incorporated by reference herein in its entirety.

FIELD OF THE INVENTION

The invention relates generally to translating a dimension between data structures of different entities and more particularly to a system and method for determining categories of items between different retailers.

BACKGROUND OF THE INVENTION

Entities such as manufacturers, retailers, service providers, and others generally catalog items such as a product, a service, or a coupon that they make available. A catalog may be stored using a data structure having data elements with multiple dimensions. A dimension may include information known about the particular data element being described so that various data about the object may be ascertained. For example, dimensions such as a category, a location (e.g., a location where a product, service, or coupon is offered by an entity), and/or other information known about the item can be associated with the item. In this manner, using a dimensional data structure, entities may store and retrieve information about the items that they make available.

Typically, the data structures and dimensions of the catalogs vary from one entity to another entity and, in some cases, may be proprietary. As a result, correlating a dimension of a data structure to another dimension of another data structure may be difficult. A resulting problem is that adding an item to a given catalog or determining a category to which the item belongs for a given entity can be a time-consuming and difficult process. For example, a manufacturer wishing to promote a new item across different online and brick-and-mortar retailers may find it difficult to determine how these retailers and other entities categorize the new item because the various retailers have different data structures and catalogs.

Conventionally, such determinations are a manual process by those having knowledge of the data structures used by an entity. Thus, what is needed is to automatically translate a dimension of one data structure to another data structure. More particularly, what is needed is to be able to determine a category of an item from various entities that use different data structures for storing the category of the item. These and other drawbacks exist.

SUMMARY OF THE INVENTION

The invention addressing these and other drawbacks relates to a system and method for translating between dimensions of different data structures used by various entities. A dimension may describe a data element stored by a data structure. The data element may represent, for example, an item such as a product, a service, a coupon, and/or other offering made by an entity. The dimension may include, for example, a Universal Product Code ("UPC") or other item identifier that identifies the item, a location of the item, an inventory/availability of the item, and/or other information known about the item. A multi-dimensional view of the item (such as its UPC, location, etc.) may be obtained using the data structure.

The system may include a dimensional translator that can be used to translate different dimensions from different data structures of the various entities. The dimensional translator may configure a computer to perform various operations, which may include receiving a dimension to be translated from a provider entity, a property of the dimension, and an identification of a target entity.

The provider entity may include an entity that wishes to translate a dimension from its data structure to another dimension in another data structure. For example, the provider entity may include a manufacturer that wishes to offer for sale a new item via various retail channels and determine how the target entity would categorize the new item. The target entity may include an entity whose data structure is to be processed so that a dimension of the provider entity may be translated thereto. For example, the target entity may include a retailer that categorizes items that it sells using a data structure.

The dimensional translator may automatically translate a dimension to another dimension by comparing attributes of the input dimension (the dimension to be translated) to attributes of a target data structure. An attribute can include information that describes a data element, a dimension, a hierarchy, a relationship and/or other information related to the data structure. The information may include descriptive text, keywords, and/or other information that describes the data structure or portions thereof. Attributes may be stored in association with the data element (e.g., each object may include meta-data or other information that describes the data element). In some instances, the dimension itself may be used as an attribute. Attributes may be stored in association with the data element (e.g., each object may include meta-data or other information that describes the data element).

In some implementations, attribute comparison may include matching attributes such as keywords to automatically determine a translation. For example, a provider entity may categorize a new frozen puffed pastry under a "Baking" category associated with a keyword "baked." A target entity may include a "Deli & Bakery" category associated with a keyword "baked goods." Dimensional translator may determine that the keywords match and correlate the Baking category with the Deli & Bakery category. Thus, based on the comparison, the dimension translator may translate a UPC dimension of the new frozen puffed pastry into the Deli & Bakery category of the target entity.

In some implementations, attribute comparison may include comparing content of dimensions from different data structures to automatically determine a translation. For example, dimensional translator may determine that a target entity includes particular UPCs of a provider entity, indicating that the target entity carries items (and therefore store information related to the items in its data structure) related to the particular UPCs. Dimension translator may use knowledge of how the target entity stores the particular UPCs to determine how the target entity would store the new item. For example, the provider entity may categorize the new frozen puffed pastry item and an existing pastry item in a "Baking" category. The target entity may categorize the existing pastry item (or similar items) in a "Deli & Bakery" category. Using this information, dimension translator may determine that the new frozen puffed pastry item should be categorized in the "Deli & Bakery" category of the target entity.

In some implementations, the dimensional translator may determine the hierarchy and/or data relationships of a data structure. For example, dimension translator may determine that a dimension called "UPC" includes item identifiers (e.g., UPCs). If the UPC dimension is hierarchically below or otherwise related to (such as having a database link to) a category dimension, dimension translator may determine that the UPC dimension includes items and that such items may be categorized according to the category dimension. Thus, dimension translator may analyze hierarchies and/or relationships of data in order to understand how an entity stores its data.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

Figure 1:
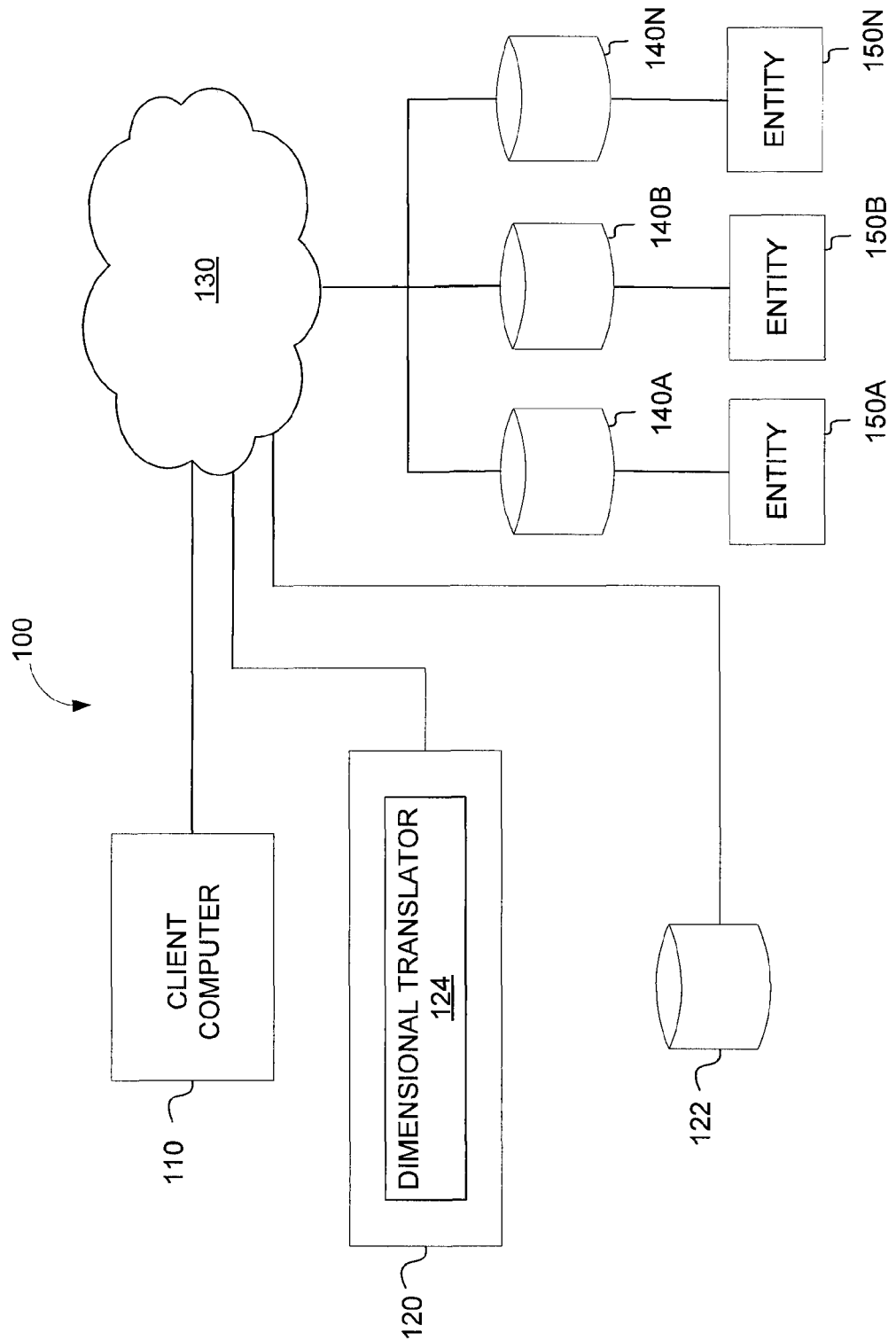
FIG. 1 illustrates a system of translating dimensions between different data structures of different entities, according to an aspect of the invention.

FIG. 1 illustrates a system 100 of translating dimensions between different data structures of different entities, according to an aspect of the invention. Generally speaking, system 100 may allow a provider entity to determine a translation between a dimension of its data structure to a data structure of a target entity. A dimension may describe an item or person/entity. For example, the dimension may include a UPC or other item identifier that identifies the item, a location of the item, an inventory/availability of the item, a customer identification that identifies a customer of an organization, an employee identification that identifies an employee, a company identifier that identifies a company and/or other information known about the item or person/entity. A provider entity may use system 100 to input a dimension of a data element such as a UPC of an item or a customer identification and an identity of a target entity for which a translation is desired. For example, the provider entity may determine how the target entity categorizes the item.

The foregoing are merely examples of implementations and uses of the system. Other uses and implementations will now be described with respect to various system components.

Client computer 110 may include a desktop computer, a laptop, a cell phone, a smart phone, a Personal Digital Assistant, a pocket PC, or other device that a user may use to communicate with computer 120. For example, client computer 110 may communicate with computer 120 via various communication channels such as electronic mail, voice call, Short Message Service (SMS) text messaging, the Internet (e.g., via a web page), social networks, etc. The various entities described herein may use client computer 110 to interact with the system.

Computer 120 may comprise one or more computing devices configured with a dimensional translator 124 that enables the various features and functions of the invention, as described in greater detail below.

Those having skill in the art will recognize that computer 120 may comprise a processor, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including dimensional translator, may be loaded into memory and run on an operating system of computer 120. In one implementation, computer 120 may comprise a server device, a desktop computer, a laptop, a cell phone, a smart phone, a Personal Digital Assistant, a pocket PC, or other device.

Computer 120 may include or otherwise access one or more databases. In some implementations, computer 120 may obtain information from dimension databases 140 (illustrated in FIG. 1 as dimension databases 140A, 140B, . . . , 140N) associated with dimensions from various entities 150 (illustrated in FIG. 1 as entity 150A, 150B, . . . , 150N). The dimensions may correspond to a catalogue or other hierarchical information used by entity 150. Entity 150 may include online retailers, brick-and-mortar retailers, manufacturers, service providers, and/or other entities that store hierarchies of information that can be translated to a hierarchy of another entity. Computer 120 may compare information stored by dimension databases so that a translation may be made between the various entities. In some implementations, the translations may be stored in translation database 122.

In some implementations, database 140 may store attributes associated with a data structure or portions thereof. An attribute may include information that describes a data element, a hierarchy, a relationship and/or other information related to the data structure. The information may include descriptive text, keywords, and/or other information that describes the data structure or portions thereof. Attributes may be stored in association with the data element (e.g., each object may include meta-data or other information that describes the data element).

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the various entities 150 may register with the system by uploading at least a portion of their data structures for storage in database 140. For example, a provider entity may upload at least a portion of its data structure for storage in database 140. Likewise, a target entity may upload at least a portion of its data structure for storage in database 140 to make it easier for other entities to interact with their data/catalog. In some implementations, an entity 150 may act as a provider entity in some instances and a target entity in other instances.

Network 130 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), or other network.

The foregoing description of the various components comprising system architecture 100 is exemplary only, and should not be viewed as limiting. The invention described herein may work with various system configurations. Accordingly, more or less of the aforementioned system components may be used and/or combined in various implementations.

Having provided a non-limiting overview of exemplary system architecture 100, the various features and functions enabled by computer 120 will now be explained.

Figure 2A:
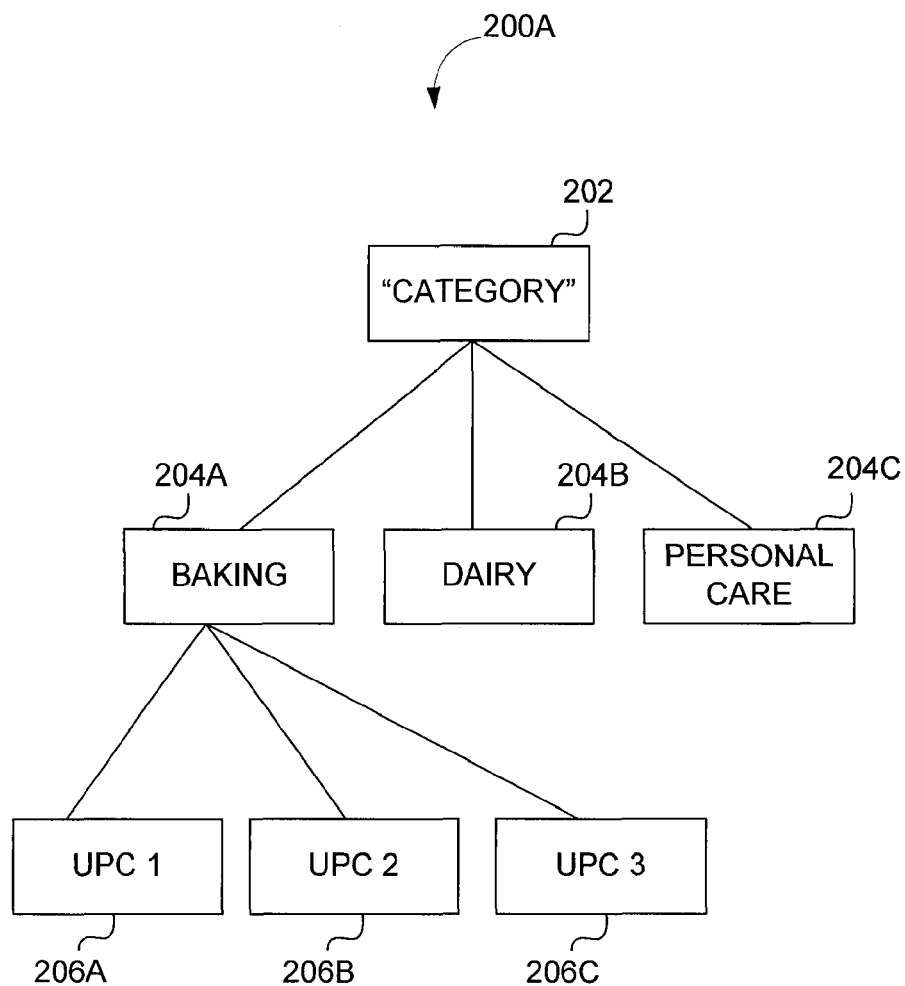
FIG. 2A illustrates a data structure of an entity that describes an organization of its items, according to an aspect of the invention.
Figure 2B:
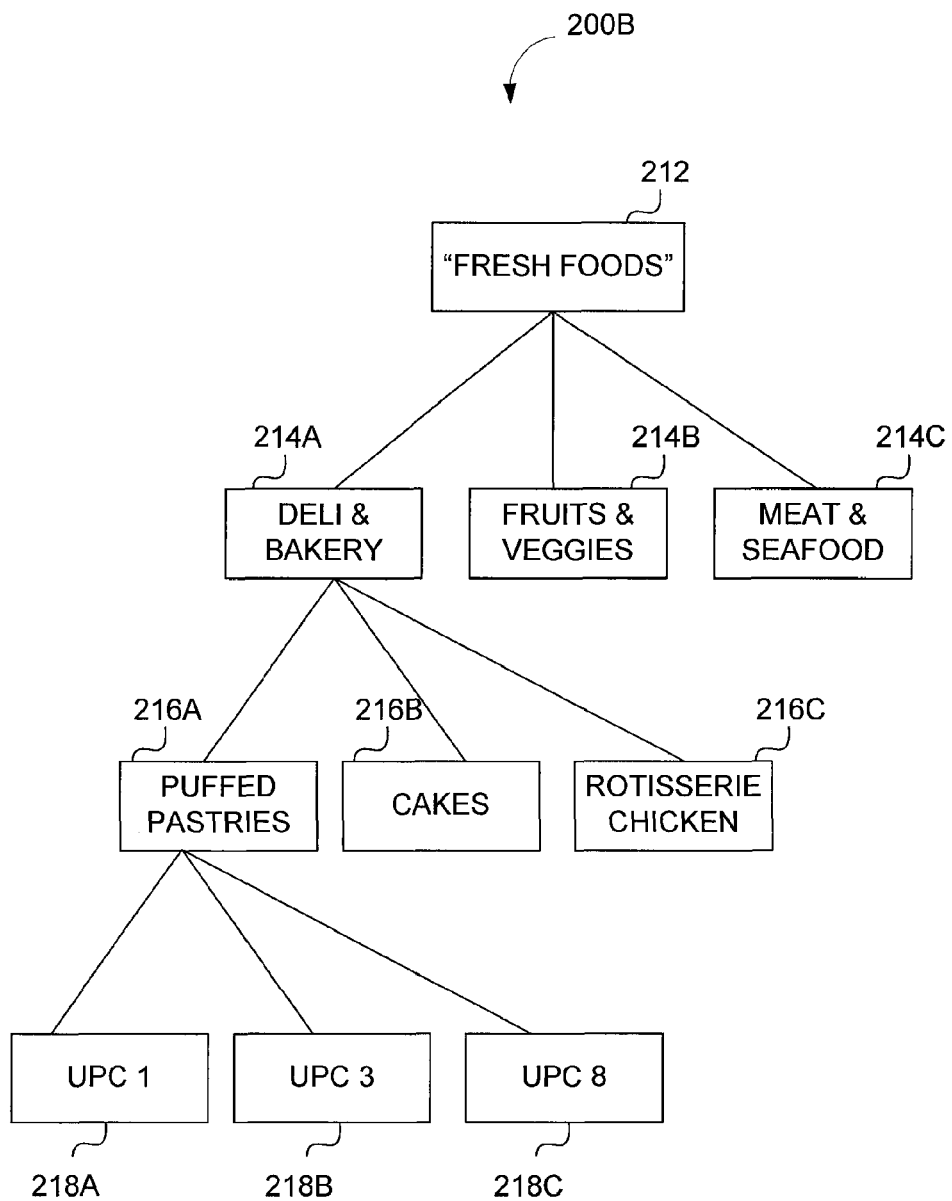
FIG. 2B illustrates a data structure of another entity that describes an organization of its items, according to an aspect of the invention.

FIGS. 2A and 2B illustrate examples of data structures from different entities that can be translated, according to an implementation of the invention. The data structures illustrated in FIGS. 2A and 2B and other drawing figures are for illustrative purposes only. A data structure as described herein may include any association or organization of information that is used to store information about a data element. Data elements can include any representation that can describe or otherwise identify an item. Furthermore, the data structures may be organized in a tree-like manner as illustrated, or other organization as would be appreciated. It should be noted that at least a portion of the data structures illustrated in the figures may be associated with an attribute, which is described herein. For example, any one of the data elements illustrated in the figures may be associated with an attribute.

FIG. 2A illustrates a data structure 200A of an entity 150A that describes an organization of its items (such as an incentive, a product and/or a service). Data structure 200A may include a data element 202 that describes a top level container for data elements 304 (illustrated in FIG. 2A as data elements 204A, 204B, 204C, although more or less data elements can be included). Data elements 204A-C describe categories of items such as a "Baking" category, a "Dairy" category, and a "Personal Care" category. Each category may include items categorized therein at data elements 206 (illustrated in FIG. 2A as data elements 206A, 206B, 206C). The items may be identified by a Universal Product Code ("UPC") and/or other identifier. As illustrated, data structure 200A includes three categories of items identified by a UPC. A category for an item offered by the entity may be easily obtained using data structure 200A. Furthermore, a new item to be carried by the entity may be placed into an appropriate category by entity 150A.

FIG. 2B illustrates a data structure 200B of another entity 150B that describes an organization of its items, but in a manner different from data structure 200A described with respect to FIG. 2A. Data structure 200B may include a data element 212 that describes a top level container for data elements 314 (illustrated in FIG. 2B as data elements 214A, 214B, 214C). Data elements 214A-C describe departments such as a "Deli & Bakery" department, a "Fruits & Vegetables" department, and a "Meat & Seafood" department. Each department may include sub-departments. For example, the Deli & Bakery department may have sub-departments "Puffed pastries," "Cakes," and "Rotisserie chicken" at data elements 216 (illustrated in FIG. 2B as data elements 216A, 216B, and 216C). Each sub-department may include items within that sub-department at, for example, data elements 218 (illustrated in FIG. 2B as data elements 218A, 218B, 218C). Each item may be identified by a UPC and/or other identifier. A department and sub-department for an item offered by the entity may be easily obtained using data structure 200B. Furthermore, a new item to be carried by the entity may be placed into an appropriate department and/or sub-department by entity 150B.

Referring to FIGS. 2A and 2B, a problem may arise when attempting to place an item offered by entity 150A into the data structure 200B of entity 150B and/or when attempting to place an item not offered by either entity into their respective data structures. For example, referring to data element 206B of FIG. 2A, an item identified by "UPC 2" may not be offered by entity 150B. Although UPC 2 is readily categorized into the "Baking" category of data structure 200A, it is not readily apparent, without a priori knowledge of data structure 200B, how entity 150B would categorize the item identified by UPC 2. For instance, because data structure 200B uses a "department" instead of a "category," it may be difficult to place the item identified by UPC 2 into a department. Even if the department were known to be "Deli & Bakery," it may be difficult to place the item identified by UPC 2 into a sub-department (e.g., it may be unclear whether the item should be characterized as a Puffed Pastry or a Cake (or, from a computational standpoint, a Rotisserie chicken).

Figure 3A:
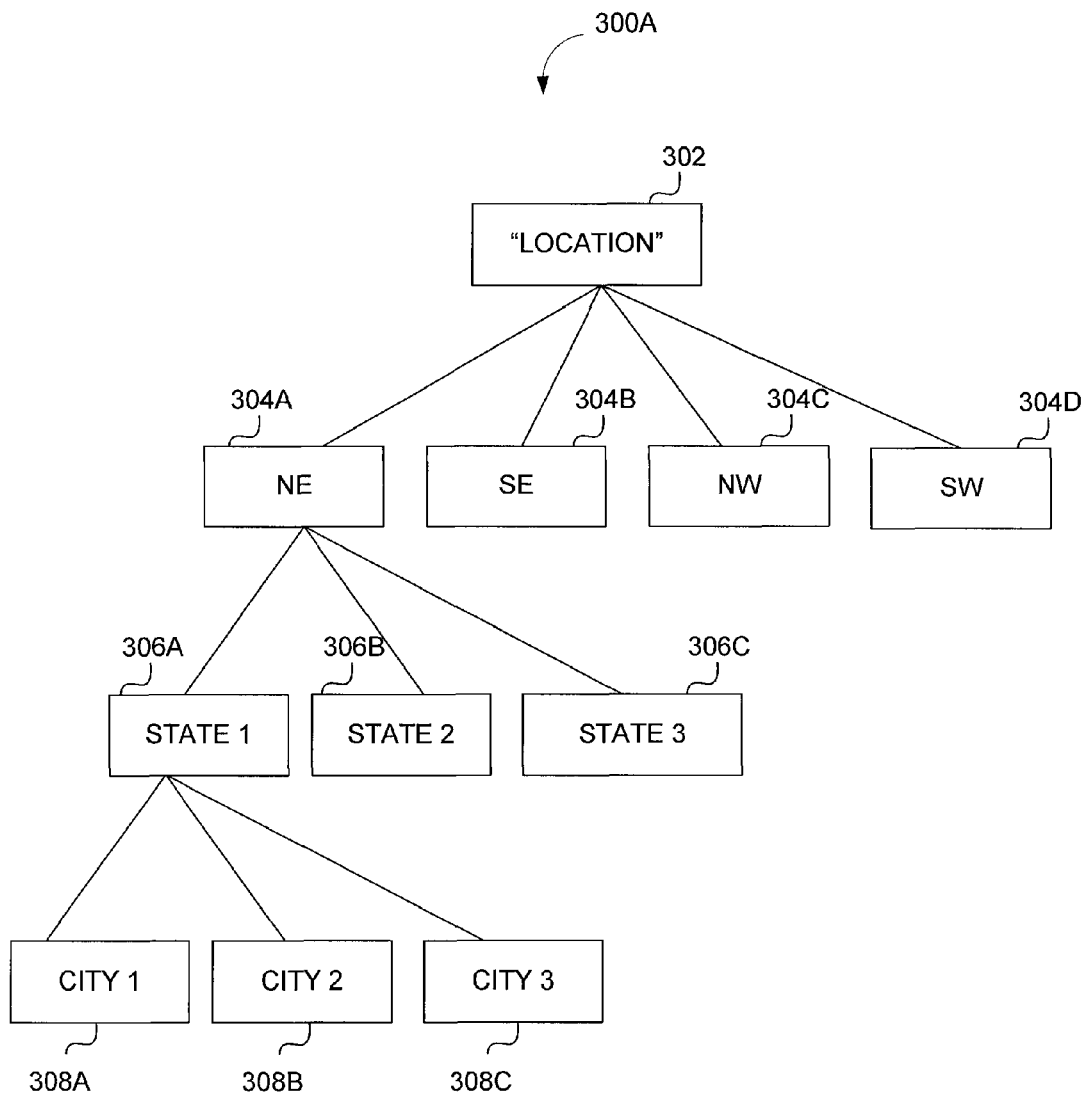
FIGS. 3A and 3B illustrate examples of data structures from different entities that can be translated, according to an implementation of the invention.
Figure 3B:
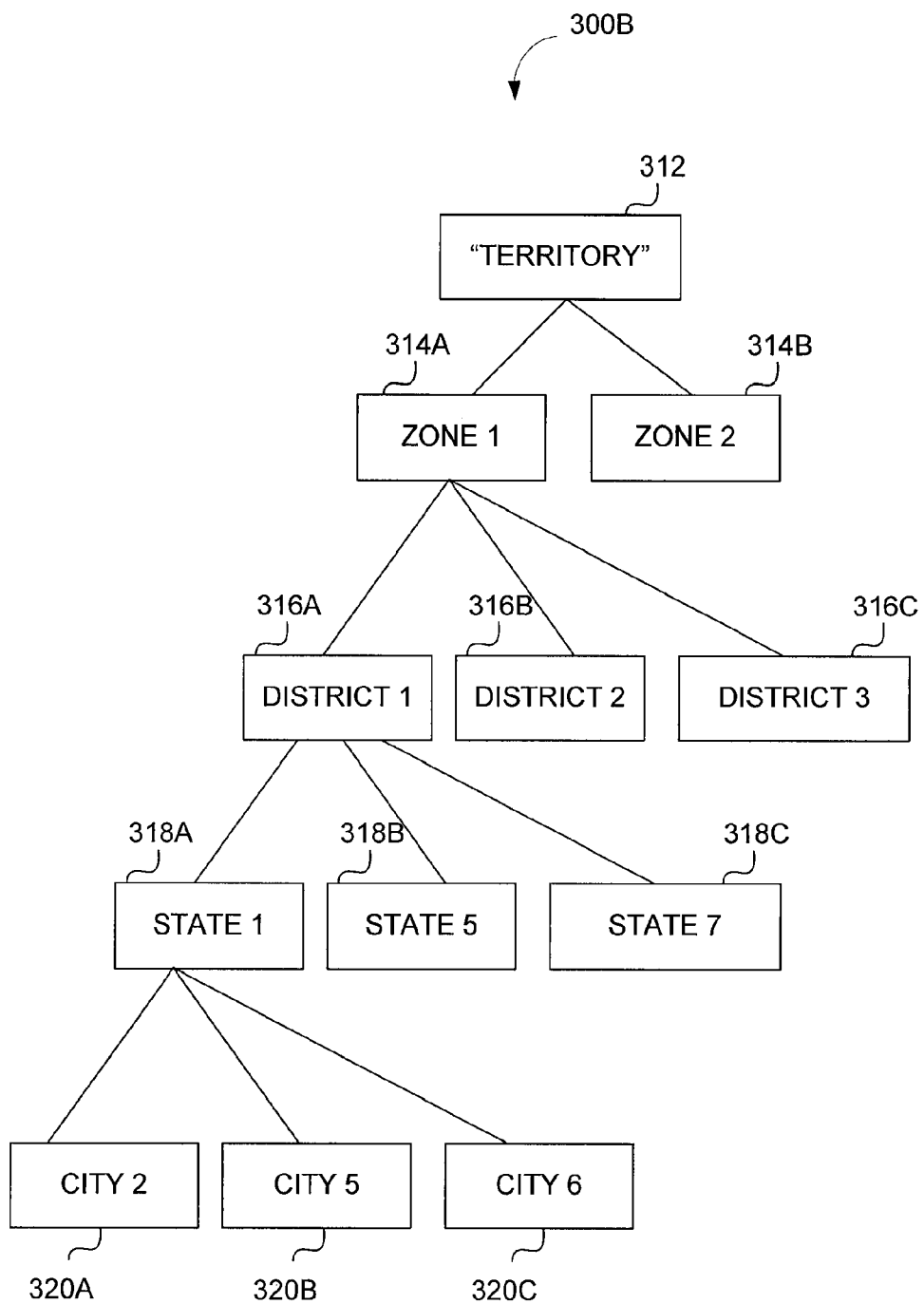

FIGS. 3A and 3B illustrate examples of data structures from different entities that can be translated, according to an implementation of the invention.

FIG. 3A illustrates a data structure 300A of entity 150A that describes locations of various assets (such as a retail location, a distribution location, a manufacturing location, an item for sale, etc.). Data structure 300A may include a data element 302 that describes a top level container for data elements 304 (illustrated in FIG. 3A as data elements 304A, 304B, 304C, 304D, although more or less data elements can be included). Data element 302 may be referred to as "locations." Data elements 304A-D describe geographic regions such as Northeast ("NE"), Southeast ("SE"), Northwest ("NW"), and Southwest ("SW") regions. A region may include sub-regions at data elements 306 (illustrated in FIG. 3A as data elements 306A, 306B, 306C). As illustrated, a sub-region may describe various states such as "State 1," "State 2," and "State 3." A sub-region may include various localities at data elements 308 (illustrated as data elements 308A, 308B, 308C). A locality may describe a city such as "City 1," "City 2," and "City 3." A region and/or sub-region for a locality may be obtained using data structure 300A. Furthermore, a new locality may be placed into an appropriate region and/or sub-region by entity 150A.

FIG. 3B illustrates a data structure 300B of another entity 150B that describes locations of various assets. Data structure 300B may include a data element 312 that describes a top level container for data elements 314 (illustrated in FIG. 3B as data elements 314A and 314B). Data element 312 may be referred to as "territories." Data elements 314A and 314B describe geographic zones such as "Zone 1" and "Zone 2." A zone may include sub-zones at data elements 316 (illustrated in FIG. 3B as data elements 316A, 316B, 316C). As illustrated, a sub-zone may describe various districts within the sub-zone such as "District 1," "District 2," and "District 3." A sub-zone may include various states at data elements 318 (illustrated as data elements 318A, 318B, 318C). As illustrated, a state may describe a state such as "State 1," "State 5," and "State 7." A state may include various localities at data elements 320 (illustrated as data elements 320A, 320B, 320C). A locality may describe a city such as "City 2," "City 5," and "City 6." A zone, district, and/or state for a locality may be obtained using data structure 300B. Furthermore, a new locality may be placed into an appropriate zone, district and/or state by entity 150B.

Referring to FIGS. 3A and 3B, a problem similar to that described with respect to FIGS. 2A and 2B may arise when attempting to place locality of entity 150A into the data structure 300B of entity 150B and/or when attempting to place a locality not associated with either entity into their respective data structures.

Table 1A illustrates a dimensional view of data structure 200A, according to an implementation of the invention.

|      | Dimension |     |
|------|-----------|-----|
| Item | Category  | UPC |
| A    | Baking    | 1   |
| B    | Baking    | 2   |
| C    | Baking    | 3   |

Table 1B illustrates a dimensional view of data structure 200B.

|      | Dimension     |                 |     |
|------|---------------|-----------------|-----|
| Item | Department    | Sub-department  | UPC |
| A    | Deli & Bakery | Puffed Pastries | 1   |
| B    | Deli & Bakery | Puffed Pastries | 3   |
| C    | Deli & Bakery | Puffed Pastries | 8   |

Table 2A illustrates a dimensional view of data structure 300A, according to an implementation of the invention.

| Dimension |         |        |
|-----------|---------|--------|
| Location  | State   | City   |
| NE        | State 1 | City 1 |
| NE        | State 1 | City 2 |
| NE        | State 1 | City 3 |

Table 2B illustrates a dimensional view of data structure 300B, according to an implementation of the invention.

| Dimension |            |         |      |
|-----------|------------|---------|------|
| Territory | District   | State   | City |
| Zone 1    | District 1 | State 1 | 2    |
| Zone 1    | District 1 | State 1 | 5    |
| Zone 1    | District 1 | State 1 | 6    |

In some implementations, a data element such as data element 306 may be viewed from a multi-dimensional perspective. For example, referring to FIG. 2A, an item identified by a UPC may be associated with a city, thereby allowing a multi-dimensional view or representation of the item across data structures 200A and 300A. In this example, data structure 300A stores a location of the item carried by entity 150A. Tables 3A and 3B illustrate a dimensional view of items carried by entity 150A.

Table 3A illustrates a dimensional view of data structures 200A and 300A, according to an implementation of the invention.

|      | Dimension |     |          |         |        |
|------|-----------|-----|----------|---------|--------|
| Item | Category  | UPC | Location | State   | City   |
| A    | Baking    | 1   | NE       | State 1 | City 1 |
| B    | Baking    | 2   | NE       | State 1 | City 1 |
| C    | Baking    | 3   | NE       | State 1 | City 1 |

Table 3B illustrates a dimensional view of data structures 200B and 300B, according to an implementation of the invention.

|      | Dimension      |                 |     |           |              |         |        |
|------|----------------|-----------------|-----|-----------|--------------|---------|--------|
| Item | Department     | Sub-department  | UPC | Territory | Sub-territory | State   | City   |
| A    | Bakery & Deli  | Puffed Pastries | 1   | Zone 1    | District 1   | State 1 | City 2 |
| B    | Bakery & Deli  | Puffed Pastries | 3   | Zone 1    | District 1   | State 1 | City 2 |
| C    | Bakery & Deli  | Puffed Pastries | 8   | Zone 1    | District 1   | State 1 | City 2 |

Figure 4B:
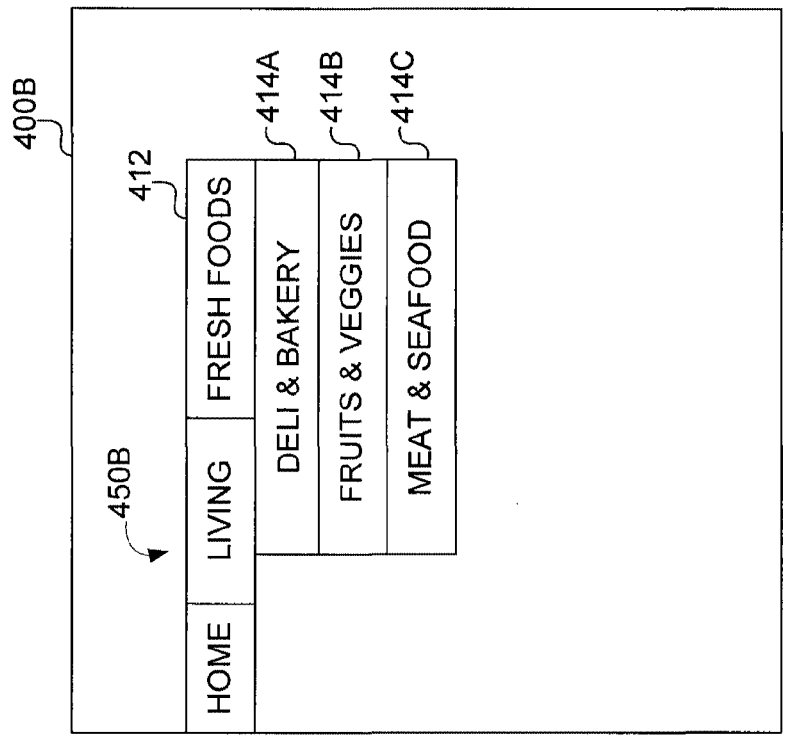
FIGS. 4A and 4B illustrate interfaces that illustrate use of the data structure illustrated in FIGS. 3A and 3B, according to an aspect of the invention.
Figure 4A:
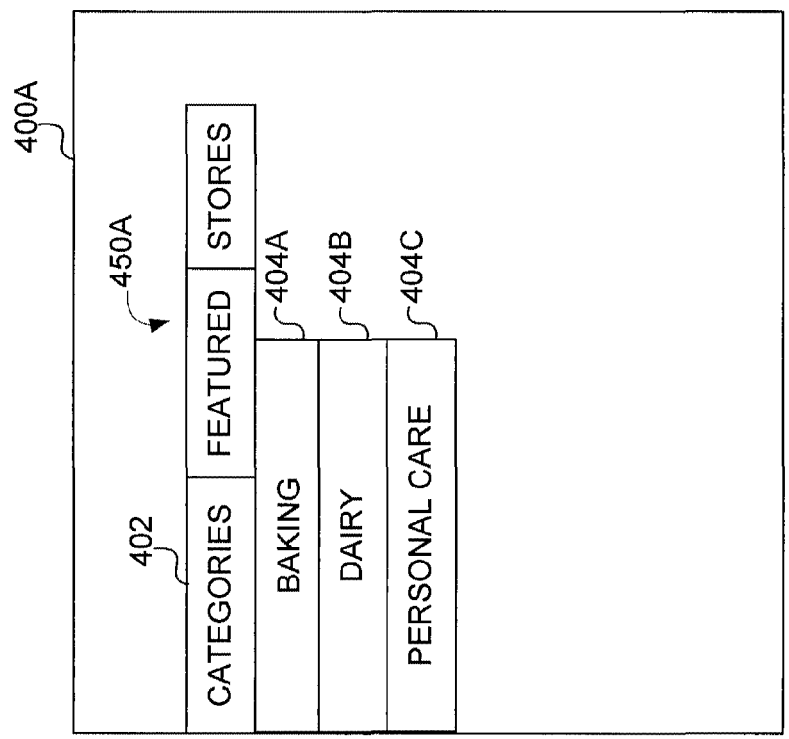

FIG. 4A illustrates an interface 400A that illustrates a use of data structure 200A, according to an aspect of the invention. The screenshots illustrated in FIG. 4A and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 400A and other interfaces described herein may be implemented as a web page communicated from computer 120 to a client, an application such as a mobile application executing on the client that receives generates the interface based on information communicated from computer 120, and/or other interface. Whichever type of interface is used, computer 120 may communicate the data and/or formatting instructions related to the interface to the client, causing the client to generate the various interfaces of FIG. 4A and other drawing figures. Furthermore, computer 120 may receive data from the client via the various interfaces, as would be appreciated.

For example, interface 400A may include a website of entity 150A. As such, various data graphical user interface elements may be based on data structure 200A. Interface 400A may include a navigation bar 450A, which may include links to information related to various data elements such as data element 402, which may in turn include links information related to data elements 304. For example, navigation bar 450A includes a link to categories, under which links to "Baking," "Dairy," and "Personal Care" are provided. Selection of a category may result in displaying various items related to the selected category. For example, selection of the Baking category may result in displaying various items related to Baking.

FIG. 4B illustrates an interface 400B that illustrates a use of data structure 200B, according to an aspect of the invention. For example, interface 400B may include a website of entity 150B. As such, various data graphical user interface elements may be based on data structure 200B. Interface 400B may include a navigation bar 450B, which may include links to information related to various data elements such as data element 412, which may in turn include links to information related to data elements 414. For example, navigation bar 450B includes a link to a Fresh Foods department, under which links to "Deli & Baking," "Fruits & Vegetables," and "Meats & Seafood" departments are provided. Selection of the Deli & Baking department may result in displaying various items related to the Deli & Baking department.

The screenshots illustrated in FIGS. 4A and 4B further highlight the different ways in which one entity may represent its data and/or categorizations of data compared to another entity. A manufacturer or other entity wishing to introduce the item to the entities may be unaware of how the item should be categorized. For example, from a computational standpoint, an entity wishing to promote a refrigerated dough product may not know how target entities (e.g., entities that are related to interfaces 400A and 400B) would categorize the product.

Figure 5:
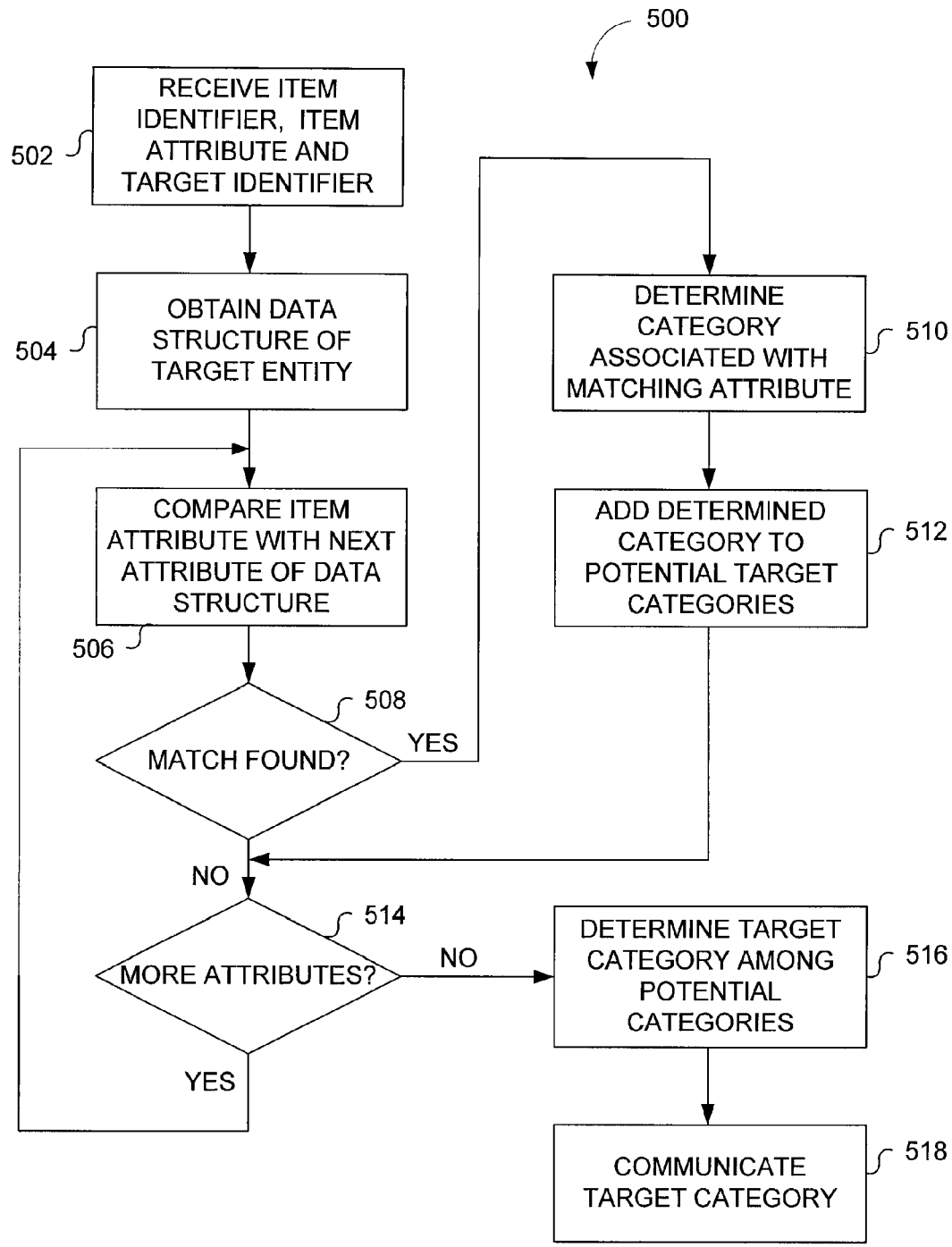
FIG. 5 illustrates a process for translating dimensions between different data structures, according to an aspect of the invention.

FIG. 5 illustrates a process 500 for translating dimensions between different data structures, according to an aspect of the invention. The various processing operations and/or data flows depicted in FIG. 5 (and in the other drawing figures) are described in greater detail herein. The described operations may be accomplished using some or all of the system components described in detail above and, in some embodiments, various operations may be performed in different sequences. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, process 500 may include receiving an item identifier, an item attribute, and an identification of a target entity. The item identifier can include, for example, a UPC and/or other identifier that can identify the new puffed pastry item. The item attribute may include various attributes such as a category "Frozen Baked Items," a description of the item, keywords such as "frozen," "baked good," "bakery," etc., and/or other information about the item from the providing entity. In some implementations, the item attribute may be received from a data structure of the providing entity, which may be stored using an entity database. In an example, the providing entity such as a manufacturer may wish to have the target entity such as a retailer or coupon provider carry and/or promote a new puffed pastry item. The providing entity may place the new puffed pastry item in its data structure in the category "Frozen Baked Items" but may not know how the target entity will categorize the new puffed pastry item.

Process 500 allows the providing entity to automatically translate a dimension associated with its data structure into a dimension of a target entity. In the foregoing example, the providing entity may translate a UPC dimension and/or category dimension of the new puffed pastry item into a category dimension of a data structure of a target entity. Thus, by inputting a UPC and properties of the new puffed pastry item, the providing entity may receive an indication of an automatically determined category into which the target entity would categorize the new puffed pastry item.

In an operation 504, process 500 may include obtaining a data structure of the target entity. The data structure of the target entity may include a target category in which the target entity would categorize the item. In some implementations, the data structure of the target entity includes a plurality of target attributes. The target attributes may describe a dimension of a data element of the data structure. For example, a target attribute may include a hierarchical level in which a dimension resides on a data structure, a description of a category of items of the target entity, a description of an item of the target entity, a keyword of an item of the target entity, and/or other information that describes various dimensions of the data structure of the target entity.

In an operation 506, process 500 may include comparing the received item attribute from the providing entity with a next attribute of the plurality of target attributes of the data structure of the target entity. The next attribute may include an attribute not already compared to the property among a plurality of target attributes. The comparison may include matching text (e.g., string comparison), context (e.g., whether the property and the next target attribute both describe geographic regions such as cities), and/or other conventional matching/comparison techniques. As would be appreciated, a "match" need not be a perfect match. Fuzzy matching or other matching logic may be used to determine a best match or probability of matching.

In an operation 508, if a match is found, process 500 may include determining a category associated with the matching attribute in an operation 510. For example, if the target property is "baked goods" and the next target attribute is "baked items," process 500 may determine that the property matches the next target attribute and determine a category associated with the matching target attribute "baked items" in the data structure of the target entity. For instance, if the matching target attribute describes or is otherwise associated with a category "Baking," process 500 may determine that the category "Baking" is a potential target category for the item and add the potential target category to a list of potential target categories in an operation 512.

Process 500 may then proceed to an operation 514, which includes determining whether more target attributes are to be processed. Returning to operation 508, if a match is not found, process 500 may proceed to determining whether more target attributes are to be processed in operation 514.

In operation 514, process 500 may include determining whether more attributes of the data structure of the target entity is to be processed. If more attributes are to be processed, the processing may return to operation 506. Otherwise, processing may proceed to an operation 516.

In operation 516, process 500 may include determining a target category for the item based on the potential categories that were identified. In an operation 518, process 500 may include communicating the determined target category. In some implementations, process 500 may include communicating the potential target categories.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of categorizing items to be sold by a retailer, the method being implemented on a computer comprising one or more physical processors executing one or more computer executable instructions which, when executed by the one or more physical processors, cause the computer to perform the method, the method comprising:
    obtaining, by the computer, an item attribute that describes an item to be sold by the retailer;
    obtaining, by the computer, a data structure of the retailer that describes a plurality of categories including a first category and a second category of items sold by the retailer, wherein the data structure comprises a hierarchy that describes an association between the first category and the second category;
    determining, by the computer, that the item belongs to the first category based on the data structure of the retailer and the item attribute;
    determining, by the computer, that the item is associated with the second category based on the hierarchy and the first category; and
    providing, by the computer, an indication of the first category and the second category.

2. The method of claim 1, wherein the item attribute comprises a keyword that describes the item.

3. The method of claim 2, wherein each of the plurality of categories is associated with respective sets of one or more keywords such that the first category is associated with one or more keywords that describe items in the first category.

4. The method of claim 3, wherein determining that the item belongs to the first category comprises:
    comparing, by the computer, the keyword with the respective sets of one or more keywords associated with each of the plurality of categories;
    determining, by the computer, a perfect or imperfect match between the keyword and at least one of the keywords from the respective sets of one or more keywords, wherein the item is determined to belong to the first category based on the perfect or imperfect match.

5. The method of claim 1, wherein the item attribute comprises an item identifier that identifies the item.

6. The method of claim 5, wherein the item identifier comprises a universal product code.

7. The method of claim 5, wherein the data structure of the retailer comprises: (i) a second item identifier that identifies a second item related to the item, and (ii) an association between the second item and the first category.

8. The method of claim 7, wherein determining that the item belongs to the first category comprises:
    determining, by the computer, that the item is related to the second item;
    determining, by the computer, that the item belongs to the first category based on (i) the association between the second item and the first category, and fill the determination that the item is related to the second item.

9. The method of claim 1, the method further comprising:
    obtaining, by the computer, a location attribute of the item that indicates a location associated with where a manufacturer would provide the item;
    comparing, by the computer, the location attribute with a retailer location attribute associated with the data structure, wherein the retailer location attribute indicates where a given item is to be sold; and
    determining, by the computer, where the item is to be sold by the retailer based on the comparison.

10. The method of claim 1, wherein the second category includes the first category as a sub-category of the second category.

11. A system of categorizing items to be sold by a retailer, the system comprising:
    a computer comprising one or more physical processors programmed to execute one or more computer executable instructions which, when executed by the one or more physical processors, cause the computer to:
    obtain an item attribute that describes an item to be sold by the retailer;
    obtain a data structure of the retailer that describes a plurality of categories including a first category and a second category of items sold by the retailer, wherein the data structure comprises a hierarchy that describes an association between the first category and the second category;
    determine that the item belongs to the first category based on the data structure of the retailer and the item attribute;
    determine that the item is associated with the second category based on the hierarchy and the first category; and
    provide an indication of the first category and the second category.

12. The system of claim 11, wherein the item attribute comprises a keyword that describes the item.

13. The system of claim 12, wherein each of the plurality of categories is associated with respective sets of one or more keywords such that the first category is associated with one or more keywords that describe items in the first category.

14. The system of claim 13, wherein to determine that the item belongs to the first category, the one or more physical processors are further programmed to cause the computer to:
    compare the keyword with the respective sets of one or more keywords associated with each of the plurality of categories;
    determine a perfect or imperfect match between the keyword and at least one of the keywords from the respective sets of one or more keywords, wherein the item is determined to belong to the first category based on the perfect or imperfect match.

15. The system of claim 12, wherein the item attribute comprises an item identifier that identifies the item.

16. The system of claim 15, wherein the item identifier comprises a universal product code.

17. The system of claim 15, wherein the data structure of the retailer comprises: (i) a second item identifier that identifies a second item related to the item, and (ii) an association between the second item and the first category.

18. The system of claim 17, wherein to determine that the item belongs to the first category, the one or more physical processors are further programmed to cause the computer to:
    determine that the item is related to the second item;

determine that the item belongs to the first category based on (i) the association between the second item and the first category, and (ii) the determination that the item is related to the second item.

19. The system of claim 12, wherein the one or more physical processors are further programmed to cause the computer to:
obtain a location attribute of the item that indicates a location associated with where a manufacturer would provide the item;
compare the location attribute with a retailer location attribute associated with the data structure, wherein the retailer location attribute indicates where a given item is to be sold; and
determine where the item is to be sold by the retailer based on the comparison.

20. The system of claim 11, wherein the second category includes the first category as a sub-category of the second category.

21. A computer-implemented method of generating an interface that includes a category of items sold by a retailer, the method being implemented on a computer associated with the retailer, the computer comprising a physical processor executing one or more computer executable instructions which, when executed, perform the method, the method comprising:
providing, by the computer, an item attribute that describes an item to be sold by the retailer;
providing, by the computer, a data structure of the retailer that describes a plurality of categories of items sold by the retailer;
receiving, by the computer, a category from among the plurality of categories in which the item should be placed, wherein the category is identified based on the data structure of the retailer and the item attribute;
generating, by the computer, an interface that includes a plurality of items, including the item, categorized based on their respective categories; and
providing, by the computer, the interface.

22. The computer-implemented method of claim 21, wherein the interface comprises an arrangement of the plurality of items based on their respective categories in an electronic interface or a hard copy catalog.

23. A computer-implemented method of determining how a target entity would categorize a first item from a provider entity, the method being implemented on a computer comprising one or more physical processors executing one or more computer executable instructions which, when executed by the one or more physical processors, cause the computer to perform the method, the method comprising:
obtaining, by the computer, a first product identifier that identifies the first item;
obtaining, by the computer, a first data structure of the provider entity that describes at least a first category of items, wherein the first category of items comprises a first set of one or more product identifiers that each identifies a corresponding item classified by the provider entity in the first category;
obtaining, by the computer, a second data structure of the target entity that describes at least a second category of items, wherein the second category of items comprises a second set of one or more product identifiers that each identifies a corresponding item classified by the target entity in the second category;
comparing, by the computer, the first set of one or more product identifiers with the second set of one or more product identifiers;

determining, by the computer, that the first category of the provider entity corresponds to the second category of the target entity based on the comparison;
determining, by the computer, that the first item from the provider entity is categorized by the provider entity in the first category based on the first data structure;
determining, by the computer, that the first item is likely categorized by the target entity in the second category based on the determination that the first category of the provider entity corresponds to the second category of the target entity and the determination that the first item from the provider entity is categorized by the provider entity in the first category;
providing, by the computer, an indication that the first item likely belongs to the second category.

24. The method of claim 23, wherein the one or more product identifiers comprise one or more Universal Product Codes (UPCs).

25. The method of claim 23, wherein the first category is named differently than the second category.

26. The method of claim 23, wherein the first set of one or more items corresponds to a first set of attributes, the second set of one or more items corresponds to a second set of attributes, and wherein the determination that the first category of the provider entity corresponds with the category of the target entity is further based on:
comparing, by the computer, the first set of attributes with the second set of attributes.

27. The method of claim 26, wherein the first set of attributes comprise information that describes one or more of: a data element, a data hierarchy, a relationship, descriptive text, or a keyword.

28. A system determining how a target entity would categorize a first item from a provider entity, the system comprising:
a computer comprising one or more physical processors programmed to execute one or more computer executable instructions which, when executed by the one or more physical processors, cause the computer to:
obtain a first product identifier that identifies the first item;
obtain a first data structure of the provider entity that describes at least a first category of items, wherein the first category of items comprises a first set of one or more product identifiers that each identifies a corresponding item classified by the provider entity in the first category;
obtain a second data structure of the target entity that describes at least a second category of items, wherein the second category of items comprises a second set of one or more product identifiers that each identifies a corresponding item classified by the target entity in the second category;
compare the first set of one or more product identifiers with the second set of one or more product identifiers;
determine that the first category of the provider entity corresponds to the second category of the target entity based on the comparison;
determine that the first item from the provider entity is categorized by the provider entity in the first category based on the first data structure;
determine that the first item is likely categorized by the target entity in the second category based on the determination that the first category of the provider entity corresponds to the second category of the target entity and the determination that the first item from the provider entity is categorized by the provider entity in the first category;

provide an indication that the first item likely belongs to the second category.

29. The system of claim 28, wherein the one or more product identifiers comprise one or more Universal Product Codes (UPCs).

30. The system of claim 28, wherein the first category is named differently than the second category.

31. The system of claim 28, wherein the first set of one or more items corresponds to a first set of attributes, the second set of one or more items corresponds to a second set of attributes, and wherein the determination that the first category of the provider entity corresponds with the category of the target entity is further based on a comparison of the first set of attributes with the second set of attributes.

32. The system of claim 31, wherein the first set of attributes and the second set of attributes comprise information that describes one or more of: a data element, a data hierarchy, a relationship, descriptive text, or a keyword.

* * * * *